Figure 1:
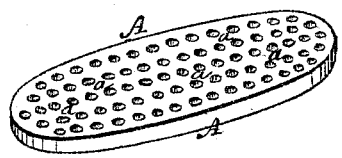

G. A. SCOTT.

Tooth, Nail, and Other Brushes.

No. 133,599.            Patented Dec. 3, 1872.

Witnesses
A. Moore
Edmund Masson

Inventor
George A. Scott,
By atty A. B. Stoughton.

UNITED STATES PATENT OFFICE.

GEORGE A. SCOTT, OF NEW YORK, N. Y.

IMPROVEMENT IN TOOTH, NAIL, AND OTHER BRUSHES.

Specification forming part of Letters Patent No. 133,599, dated December 3, 1872.

*To all whom it may concern:*

Be it known that I, GEORGE A. SCOTT, of the city, county, and State of New York, have invented certain new and useful Improvements in the Manufacture of Tooth, Nail, and other similar Brushes, wherein bristles or their equivalent are used; and I do hereby declare the following to be a full, clear, and exact description of the same, reference being had to the accompanying drawing making a part of this specification, in which—

Figure 1 represents in perspective a plate or block for receiving and holding the bristles, which plate or block, with its bristles, is to be attached to any suitable back or handle to form a brush.

Tooth, nail, and other similar brushes are ordinarily made of wood, bone, or other hard substance, and after being sawed out and shaped are afterward drilled or bored, with cutting or abrading machines or tools, for the reception of the bristles. I am aware, however, that tooth-brushes have been molded from India rubber, and that toilet-brushes have been made of a composition which also is molded in dies, with a recess in the back for the reception of a block for containing the bristles, the holes in which block were bored therein after the block was made. I lay no claim to any of these things.

My invention consists in molding the holes for the bristles in a plate or block while the substance or composition of which the plate or block is made is in a plastic condition, and so avoid the expense of boring such holes.

To enable other skilled in the art to make and use my invention, I will proceed to describe the same with reference to the drawing.

The plate or block A may be made of any of the known compositions used in making brushes or brush-backs, that of which shellac is a constituent answering a good purpose. This plate or block, of square, round, oval, or any other desirable shape or outline, is molded in dies of which one part of the die is furnished with a series of pins or their equivalent for forming holes, *a a*, &c., in said block. The shaping of the plate or block and the forming of the holes therein may be done at one and the same operation. The molding-in of the holes, however, is the gist of my invention. This molded block with its molded holes may be furnished with bristles, or their known substitutes, in the usual way and then fastened to a back or handle suitable for the purpose or object designed.

Having thus fully described my invention, what I claim is—

A molded plate or block for containing bristles or their substitute, when the holes in said plate or block are molded therein while the composition of which the plate or block is made is in a plastic state, as and for the purpose described and represented.

GEO. A. SCOTT.

Witnesses:
 E. W. EATON,
 B. L. COOK.